US012664915B2

(12) United States Patent
Rossl

(10) Patent No.: US 12,664,915 B2
(45) Date of Patent: Jun. 23, 2026

(54) FASTENING ELEMENT FOR FASTENING OR FIXING A DISPLAY UNIT TO A SUPPORT DEVICE AND DISPLAY UNIT

(71) Applicant: VusionGroup GmbH, Fernitz-Mellach (AT)

(72) Inventor: Andreas Rossl, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 417 days.

(21) Appl. No.: 18/337,880

(22) Filed: Jun. 20, 2023

(65) Prior Publication Data

US 2024/0428709 A1 Dec. 26, 2024

(51) Int. Cl.
*G09F 3/20* (2006.01)

(52) U.S. Cl.
CPC .............. *G09F 3/208* (2013.01); *G09F 3/204* (2013.01)

(58) Field of Classification Search
CPC ................................. G09F 3/208; G09F 3/204
See application file for complete search history.

(56) References Cited

U.S. PATENT DOCUMENTS 6,418,651 B1 * 7/2002 Joliey ..................... G09F 3/204 40/621
2003/0111580 A1 * 6/2003 Catteau ................... G09F 3/204 248/222.51
2010/0088937 A1 * 4/2010 Lee ........................... G09F 3/20 40/642.02
2011/0102155 A1 * 5/2011 Choi ......................... G09F 3/16 235/383
2012/0023797 A1 * 2/2012 Rosander ................ G09F 3/208 40/655
2012/0060399 A1 * 3/2012 Sjodln ..................... G09F 3/204 40/655
2022/0360695 A1 * 11/2022 Schwarz ................ H04N 23/57
(Continued)

FOREIGN PATENT DOCUMENTS

CN 1260897 A 7/2000
EP 2425750 A1 3/2012
(Continued)

OTHER PUBLICATIONS

An Office Action mailed by China National Intellectual Property Administration on Aug. 1, 2025, which corresponds to Chinese Patent Application No. 202080108123.0 and is related to U.S. Appl. No. 18/337,880.
(Continued)

*Primary Examiner* — Gary C Hoge
(74) *Attorney, Agent, or Firm* — Studebaker Brackett PLLC

(57) ABSTRACT

A fastening element, which is used for fastening or fixing a display unit, preferably an electronic display unit, particularly preferably an electronic price- and/or product-information display unit, to a support device, which is preferably designed as a shelf edge strip, the fastening element comprising at least one locking element, which is retractable and extensible and preferably constructed as a pin, which is held in its extended position by a spring, which is provided in the fastening element, and can be moved counter to the force of the spring to a retracted position, characterized in that the fastening element is realized as a separate fastening module.

20 Claims, 6 Drawing Sheets

(56) References Cited

U.S. PATENT DOCUMENTS

| | | | | |
|---|---|---|---|---|
| 2022/0398945 | A1* | 12/2022 | Jubro | G09F 7/06 |
| 2023/0215299 | A1* | 7/2023 | Johns | G09F 3/204<br>40/642.02 |
| 2024/0242639 | A1* | 7/2024 | Schwarz | G09F 3/208 |

FOREIGN PATENT DOCUMENTS

| | | | | |
|---|---|---|---|---|
| GB | 2469352 | A * | 10/2010 | G09F 3/204 |
| KR | 10-2010-0112804 | A | 10/2010 | |

OTHER PUBLICATIONS

International search report from WO Publication WO 2022/135716 A1 the Parent of the present application.

* cited by examiner

FASTENING ELEMENT FOR FASTENING OR FIXING A DISPLAY UNIT TO A SUPPORT DEVICE AND DISPLAY UNIT

CROSS-REFERENCE TO RELATED APPLICATIONS

This is a 35 U.S.C. 371 National Stage Patent Application of International Application No. PCT/EP2020/087800, filed Dec. 23, 2020, which is hereby incorporated by reference in its entirety.

BACKGROUND

DE68902399T2 discloses an electronic display device, which is also termed an electronic shelf label or ESL for short and which comprises as part of its fastening element, which is structurally integrated into the ESL and is used for fastening the ESL on a shelf edge strip, a retractable locking element. The locking element projects out of the housing of the ESL and is used for latching in a groove or recess or a hole of the correspondingly designed shelf edge strip. The locking element can be retracted with the aid of a separate special tool, which is brought into direct contact with the ESL, so that the ESL can be removed from the shelf edge strip or displaced along the shelf edge strip. Using this measure, the ESL can be locked at the provided position on the shelf edge strip, so that the removal from the shelf edge strip, the theft of the ESL and also the displacement thereof along the shelf edge strip is reliably prevented or is only possible by those people who have access to the special tool.

However, the known ESL has proven disadvantageous during use, because it necessarily requires a specially designed shelf edge strip in order to be used.

Therefore, the object of the invention is to provide an improved fastening element, an improved ESL and a system using such an ESL, which is fastened to a support device and which can be used in a more flexible manner.

SUMMARY OF THE INVENTION

This object is achieved by means of a fastening element according to claim 1. The subject matter of the invention is therefore a fastening element, which is used for fastening or fixing a display unit, preferably an electronic display unit, particularly preferably an electronic price- and/or product-information display unit, to a support device, which is preferably designed as a shelf edge strip, the fastening element comprising at least one locking element, which is retractable and extensible and preferably constructed as a pin, which is held in its extended position by a spring, which is provided in the fastening element, and can be moved counter to the force of the spring to a retracted position, characterized in that the fastening element is realized as a separate module.

Furthermore, this object is achieved by an electronic display according to claim 9. The subject matter of the invention is therefore a display unit, preferably an electronic display unit, particularly preferably an electronic price- and/or product-information display unit, which comprises a housing, characterized in that the housing comprises a housing structure and the housing structure is designed for accommodating a fastening element, which is realized as a separate fastening module, wherein the fastening element is used for fastening the display unit to a support device, which is preferably designed as a shelf edge strip.

Furthermore, this object is achieved by an electronic display according to claim 14. The subject matter of the invention is therefore a system, which comprises a display unit according to the invention and a support device, which is preferably designed as a shelf edge strip, to which the display unit is fastened with the aid of the locking element of the fastening element, which is accommodated in the housing structure of the display unit, the supply device comprising at least one recess, into which the locking element is entered.

The invention therefore provides a fastening element which can be used in a modular manner and which can optionally be inserted into the display unit and removed from there again.

Using the measures according to the invention is therefore associated with the advantage that the display unit can be inserted on different types of shelf edge strips in a flexible manner. Thus, the display unit with inserted fastening element can be inserted on a specially designed shelf edge strip, which has a corresponding design, in order to be able to interact with the locking element in such a manner that the display unit can be locked with regards to its position along the shelf edge strip and also at the shelf edge strip against removal from there. Likewise, the display can be inserted without the fastening element on a different type of the shelf edge strip, which does not have any such special designs.

This also results in the logistic or economic advantage that with respect to the type of the shelf edge strip to be installed, it is possible to listen to customer wishes in a flexible manner, wherein in spite of the installation of different types of the shelf edge strip, it is always one and the same design of the display unit which is used, but once with inserted fastening element and once without this fastening unit. Therefore, with respect to the display unit, which constitutes the driver of costs in the system, the "economy of scale" aspect applies, that is to say the cost advantage at higher numbers of pieces of a single embodiment.

Further particularly advantageous embodiments and developments of the invention result from the dependent claims and also the following description.

The spring is preferably designed as a coil spring. The spring may however also be realized by a leaf spring or else by an elastic strip and the like.

The display may be designed as a simple paper- or plastic-based label, on which information about products, services and/or also prices are depicted. Preferably however, the display is an electronic display unit.

One such electronic display unit comprises electronics which are used for receiving data and reproducing image contents, which are transported with these data, in readable form using an electronic screen. Electronics of this type, the communication behaviour of which, that is to say the wireless protocol which is used there, including the screen is disclosed for example in WO2015/124197 on pages 2-32, the disclosure of which is hereby included by reference. Extremely energy-saving electrophoretic screens are preferably used as screens. However, active screens, such as e.g. LCD or OLED screens, can also be used. In addition to the battery-operated functionality, which is described there, an electronic display unit can also be supplied with electrical energy by means of near field communication (NFC) technology or else power over WiFi technology, etc. Also, data communication with the electronic displays may also be realized not only in a wireless-based manner (e.g. by means of NFC, ZigBee, Bluetooth, or else using the proprietary wireless protocol according to WO2015/124197, etc.), but also in a wired manner, as this is known for example from WO2017/153481 A1, wherein this disclosure also is included by reference.

The electronics as well as the screen and, if appropriate, an electrical energy storage device are accommodated inside a housing of the display unit. Here, the screen may, if appropriate, be covered with a protective window, which then forms a constituent of the housing, or even be used as a housing constituent if the protective window is dispensed with. The housing may also consist completely or in part of a transparent material, which encompasses and protects the screen.

The housing comprises fastening means, with the aid of which, fastening of the display unit to the support structure or support device is enabled.

The support structure or support device can be realized variously. Thus, it may for example be a tabletop sign holder, which can be erected on a counter or fixed there. Likewise, it is possible to design the support structure as a clothes tag, which can be fixed to clothes, such that the clothes tag hangs there. However, to keep the description of the invention compact, reference is made exclusively in the following to a shelf edge strip as preferred embodiment of the support structure.

Along its longitudinal extent, the shelf edge strip may comprise an (e.g. lower) first fastening rail comprising an end section, which appears hook-like in its cross section, and an (e.g. upper) second fastening rail comprising hole-like or else slot-like or groove-like recesses, which are arranged in a grid along the shelf edge strip, wherein the two fastening rails are arranged at a distance from one another in such a manner that the display unit can be inserted between these two fastening rails. A connecting web may be formed between the fastening rails and further elements for fastening the shelf edge strip may be provided on a shelf, e.g. as the front termination thereof.

So that the display unit can enter into a (possibly also interlocking) connection with the shelf edge strip, that is to say is locked in its position, the fastening means of the housing comprise e.g. a (lower) groove, into which the (lower) first fastening rail can engage with its hook-like end section. The display unit, one housing section or housing end of which is first inserted and held there, can then be pressed with its other housing section or housing end so far into the shelf edge strip until the locking element of the fastening element latches into one of the preferably hole-like recesses of the second fastening rail. As these recesses are arranged along the longitudinal extent of the shelf edge strip at equidistant spacings from one another, that is to say are arranged in a grid, it may be necessary, if appropriate, to displace the display unit to the left or right somewhat, so that the position of the locking element coincides with the position of one of the recesses and can enter or latch into the recess.

The fastening element as well as the housing structure, into which it can be introduced, can be configured in such a manner that after first pushing in the fastening module, a permanent connection between the housing and the fastening module is taken up. This may take place. e.g. by means of one or more hooks, which engage behind a catch and thereafter can no longer be released except for the action of a destructive force.

The fastening element, which is realized as a fastening module, is preferably designed or shaped in such a manner that the fastening module can be inserted or plugged, particularly such that it can be removed again, into a housing structure of the housing of the display unit, which corresponds to the shape of the fastening module. This means that the outer shape of the fastening module is adapted to the shape of the housing structure, that is to say e.g. both shapes are given by curved shapes, which can be guided or slid in one another, particularly cylindrical shapes or else angular shapes, particularly rectangular shapes. In this case, the shape of the housing structure may comprise a constant diameter along the longitudinal extent thereof. Preferably, the shape of the housing structure has a course which tapers inwards. The shape of the fastening module is likewise adapted to the said course of the shape and consequently comprises a wedge- or (truncated-) cone-like shape. This facilitates the manual insertion of the fastening module into the housing structure and also ensures a machine-based assembly process. Also, it may be advantageous for a substantially rectangular cross-sectional shape, if chamfers are formed in the transition between the side surfaces of the fastening module at least along the longitudinal edges of the fastening module, that is to say significantly shorter connecting surfaces, which run e.g. at an angle of 45°, are formed between the side surfaces. Also, the fastening module and the housing structure can be designed in such a manner that the fastening module, which is inserted into the housing structure with sufficient pressure, latches in the housing structure, e.g. with the aid of a plug or clip mechanism. This fastening mechanism can be understood as a type of plug connection, so that the fastening module can be removed from the housing structure again when loaded with corresponding pulling force, which overcomes the cohesiveness of the plug connection. In connection with this type of fastening of the fastening module in the housing structure, mention is also made of a preferred embodiment, wherein the plug or clip mechanism is accessible from outside the housing of the display unit. In this case, the plug or clip action can be dimensioned or set such that it cannot be overcome by simple manual pulling on the fastening module. Only by using a tool, which releases the plug or clip mechanism, can the fastening module be removed from the housing structure again. This embodiment is advantageous if a temporarily irreversible hold of the fastening module in the housing structure, which cannot be overcome by the normal consumer without the use of force, is desired.

In addition, the housing structure as well as the fastening module may be formed without any plug or clip mechanism, so that the fastening module can be easily inserted into the housing structure without any holding effect due to such a mechanism and interacts there in a substantially flush manner with the housing structure and can be removed therefrom again easily by applying a pulling force (or also by shaking out), specifically without any minimum force, which is caused by plug or clip action, having to be overcome.

A further aspect relates to pulling the locking element into its retracted position. This could take place e.g. by means of a special external component or tool, using which the locking element is moved by direct or indirect mechanical actuation. However, it has proven particularly advantageous, if a magnetic or magnetizable component, particularly a ferromagnetic component, which is particularly preferably realized by the locking element itself, is provided for moving the locking element, so that by means of the action of an external magnetic force on the magnetic or magnetizable component, the locking element can be moved into the retracted position, counter to the force of the spring. The external magnetic force can be generated e.g. by a separate device with an electromagnet or else by a permanent magnet. This device is held against the display unit and the action of the external magnetic force can displace the magnetic or magnetizable component provided in the fastening module in terms of its position and/or also twist the same. The component can be coupled with the locking element, that is to say connected to one another or simply positioned adjacently. Due to the coupling with the locking element, the movement of the magnetic or magnetizable component is converted into a translational or rotational movement of the locking element, so that the locking element is moved from the extended position into the retracted position, wherein the spring, which interacts with the locking element, is tensioned at the same time. As soon as the external magnetic force is discontinued, the locking element is displaced back into the extended position by the spring force of the tensioned spring. Preferably, the locking element itself realizes the magnetic or magnetizable component. This means that the magnetic force, which is applied by the external device, acts directly on the locking element. Particularly preferably, the locking element is formed from ferromagnetic steel. Therefore, a design which is as solid and long-lasting as possible results.

It has proven particularly advantageous if the fastening module comprises an outer sleeve or a cage, in which both the spring and the locking element are accommodated and the locking element protrudes out of the sleeve, e.g. at the head end, at least in the extended position. If the magnetic or magnetizable component is realized separately from the locking element, then it is advantageous if the magnetic or magnetizable component as well as possibly further components or components required for the function are accommodated inside the sleeve, so that they are protected by the sleeve. A sleeve wall of the sleeve may be left open over the whole area or else in an interrupted manner or else at least on one side, that is to say formed such that the interior of the sleeve is not enclosed completely.

A further aspect relates to the support of the spring, wherein the spring, which is supported on the sleeve, holds the locking element in the extended position. Therefore, the spring is not supported anywhere on the housing of the display unit, in which the fastening module is accommodated, but rather is situated structurally as well as functionally inside the sleeve, so that the fastening module is also fully functional outside the display unit. Thus, the spring can for example be supported at the base side on the inner side of the sleeve or interact with a further component, which is itself supported on the inner side of the sleeve, and from there interact with the locking element. Preferably, the spring sits on a pin, which is only a few millimetres long and is formed at the base or bottom side inside the sleeve. The other end of the spring interacts with the locking element directly or via an intermediate element inside the sleeve. The spring is set such that it holds the locking element in its extended position in a substantially completely or at least partially relaxed state, that is to say at least slightly preloaded state.

A further aspect relates to the movability of the locking element inside the fastening module, wherein the locking element is guided in the interior of the sleeve with the aid of a guide, preferably a box- or tube- or carriage- or rail-like guide, and can be displaced along this guide between the extended position and the retracted position. This measure also takes account of the circumstance that the fastening module functions autonomously. The aforementioned mechanical guiding of the locking element in this case substantially ensures that the locking element is guided or held at a suitable angle or in a suitable orientation, in order to enable the locking element also to interact with the support structure when used properly in a display unit. With the aid of the guiding, transverse forces, which act on the part of the locking element which protrudes out of the fastening module, can be captured. Preferably, the walls of the sleeve form a box- or tube-like guide and at least the part of the locking element itself, which is localized inside the sleeve, comprises a guide, which is formed in a carriage-like manner and is essentially adapted to the box- or tube-like guide, and thus enables sliding of the locking element inside the sleeve between the extended position and the retracted position. Furthermore, the carriage-like guide, which is formed by the locking element, can also accommodate the spring, preferably in the design as a coil spring, in its interior. The spring then interacts at its first end—as already explained previously—with the sleeve and at its second end with the locking element. It is therefore inserted or positioned in a fixed manner between these two limits and held laterally by the carriage-like guide, possibly also by a wall of the sleeve, so that it cannot yield in the lateral direction when it is tensioned. The component which spatially encloses the spring therefore also forms a type of spring cage, which holds the spring at its intended position in the fastening module.

The movement of the locking element can be limited by the base of the sleeve or by an end stop of the sleeve, which is close to the base. Preferably, the fastening module comprises a head-side cover with a cover opening, wherein the locking element protrudes through the cover opening at least in its extended position. The cover protects the interior of the fastening module from contamination and the like. Also, the cover opening may enclose the locking element e.g. in a manner which substantially follows the shape, in order to keep the gap between the opening edge and the locking element, which is required for the movement of the locking element, as small as possible, without impairing the movability of the locking element. Against this background, it may also be advantageous if the locking element has two different widths as viewed in the longitudinal direction. Thus, an end region of the locking element, which is constructed in a relatively narrower and possibly mandrel-like manner, may for example be provided, which in terms of its dimensions is adapted to the shape of the recess of the support device and is provided for entering into one of the recesses of the support device. This narrow end region may merge into a wider part of the locking element, which is present predominantly inside the sleeve and is for example adapted to the cover opening, in order to be able to slide inside the same. Preferably, the wider part of the locking element merges into the guide of the locking element, which is of carriage-like design.

It has proven particularly advantageous if the fastening module comprises a side wall adjacent to the cover, in which a side wall opening is recessed, which is designed or shaped in such a manner that the locking element can be inserted into the fastening element or removed from there. This measure ensures that the individual parts of the fastening module can be assembled and introduced into the fastening module as easily as possible. At the same time, it is thus ensured that a fastening module which is impaired in terms of its function can be disassembled as easily as possible and can possibly also be cleaned, or else defective parts can be replaced. Such a fastening module is therefore extremely maintenance friendly. Preferably, the side wall opening is formed to be large-area in such a manner that, when the fastening module is inserted into the shaft, the guide of the locking element, which is of carriage-like design, is guided on three sides by the sleeve and on the remaining fourth side, that is to say where the side wall opening is recessed, is guided by the wall of the shaft of the housing of the display unit. This constitutes an extremely material-saving embodiment for the fastening module.

With reference to the display unit, it is to be determined that the housing structure can advantageously be designed as an accommodating shaft, which is outwardly open, in a manner corresponding to the aforementioned sleeve-like shape of the fastening module. If the dimensions of the accommodating shaft of the housing and those of the sleeve of the fastening module are matched to one another with sufficient accuracy, a reliable and above all substantially play-free positioning of the display unit on the support structure can be ensured. This essentially relates to the positional accuracy transversely to the positioning surface of the support structure or support device, on which the rear side of the display unit is positioned when the display unit is inserted into the support structure.

However, the sizing of the depth of the housing structure may be important for the reliable function of the fastening module. Therefore, it is furthermore advantageous if the housing structure, particularly the accommodating shaft is realized in such a manner, particularly dimensioned in terms of depth in such a manner, that when the fastening module is fully inserted into it, the locking element of the fastening module, at least in its extended position, protrudes at the point of the housing structure beyond an outer edge of the housing structure. Therefore, it is ensured that the locking element can interact with the support structure as planned, wherein the length of the part of the locking element which protrudes over the edge is of course to be dimensioned accordingly, in order, in the extended position, to be able to engage reliably into the recess of the support device.

In order to achieve an operating life of the display unit which is as long as possible and uninfluenced by environmental influences, such as dust and liquids for example, it may furthermore be advantageous that the housing, particularly the housing structure however, that is to say specifically the accommodating shaft, seals the display unit. Using this measure, the region of the fastening element which is problematic by contrast with conventional display units can be closed or sealed, specifically without having to dispense with the fastening element, because this fastening element can be used as a separate fastening module. A housing which is sealed all around can also be realized based on this measure. The housing can thus—with the exception of the battery compartment region, into which batteries can be inserted and from which the batteries can be removed for battery replacement—be realized in a completely encapsulated manner. To produce the encapsulated housing, the components of the display unit can first be inserted into open housing parts and the housing parts can then be connected to one another in an inseparable manner.

Particularly in the case of the aforementioned design of the housing shaft, which is open on two sides, the housing shaft can simply be rinsed with cleaning liquid, such as e.g. water, in the event of contamination.

Therefore, a display unit comprising a fastening element, which is inserted into the housing structure and realized as a fastening module, can form a display unit fastening module subsystem for use in the system according to the invention, which was defined at the beginning.

In summary, it is established that the solution according to the invention differs fundamentally from known solutions, in which the housing must comprise an opening into the interior of the display unit, out of which the locking element protrudes. Therefore, by means of the solution according to the invention, the known problem, that the mostly electronic components inside the display unit as well as the mechanical components of the fastening element are exposed to the external environmental conditions unprotected, is overcome. The solution according to the invention therefore ensures that e.g. liquids or else dust-like or granular foreign substances can no longer penetrate into the interior of the housing of the display unit and therefore also the function of the electronics and the readability of the display can no longer be impaired as a result.

Even if substances penetrating into the fastening module according to the invention lead to the locking element becoming faulty or inoperable in terms of its function, the same can be made functional again by means of a simple clean which can be performed quickly. Situations in which the exchange of the entire display unit would be necessary due to a malfunction of the fastening element, as is the case in known solutions, can therefore be excluded.

Finally, it is also mentioned that the locking element can also comprise a plurality of separate projections which can suddenly be displaced between the extended and the retracted position. Also, the locking element may be included in the fastening element multiple times. The fastening element can correspondingly be adapted with regards to the size and shape thereof. Furthermore, the display device can be designed for accommodating a plurality of fastening elements.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 2:
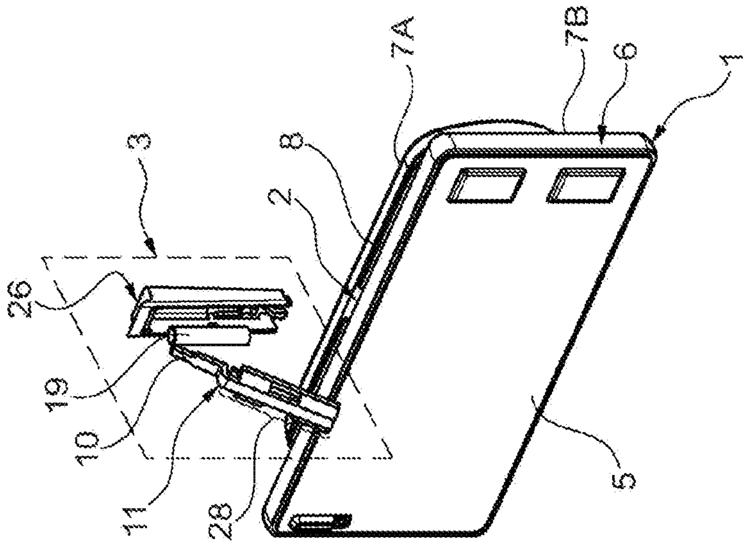
FIG. 2 shows the display unit and the fastening element, which is disassembled into parts, according to FIG. 1 from a second perspective, in a schematic manner.
Figure 1:
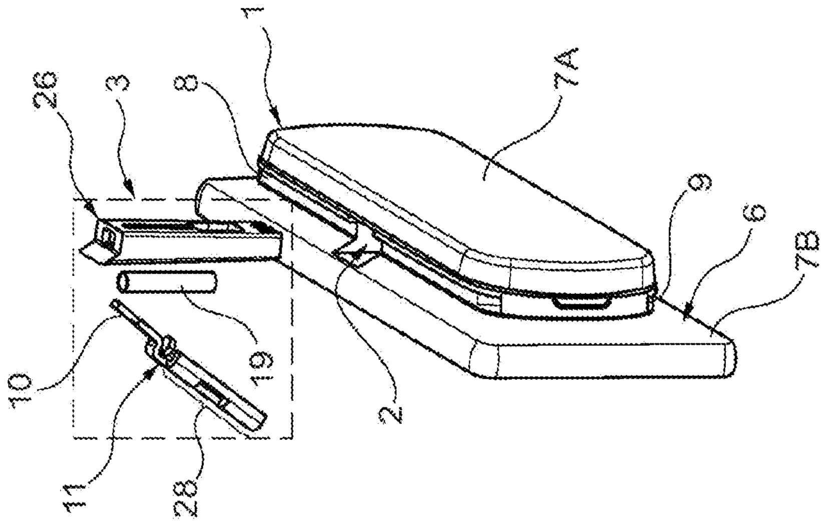
FIG. 1 shows a display unit and a fastening element, which is disassembled into parts, from a first perspective, in a schematic manner.

An electronic display unit 1 is illustrated in FIG. 1 in a viewing direction from obliquely behind, which electronic display unit comprises an outwardly open housing structure on its upwardly orientated side, wherein the housing structure is realized as an accommodating shaft 2 with a substantially rectangular cross section and is used for accommodating a fastening element, which is present separately, with respect to the display unit 1, and is designed as a fastening module 3. This fastening module 3 can be seen in FIG. 1 in an exploded illustration which shows the components of the fastening module 3, which are also covered in detail below. FIG. 2 also shows this combined illustration consisting of the display unit 1 and the fastening module 3, but from the viewing direction from obliquely in front.

Figure 4:
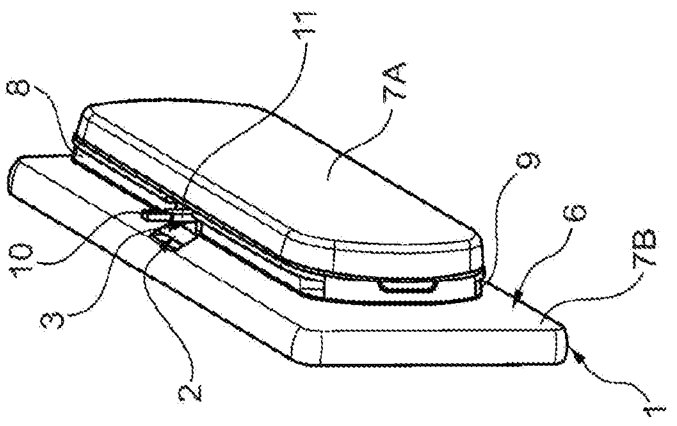
FIG. 4 shows the display unit with inserted modular fastening element in the perspective according to FIG. 1, in a schematic manner.
Figure 3:
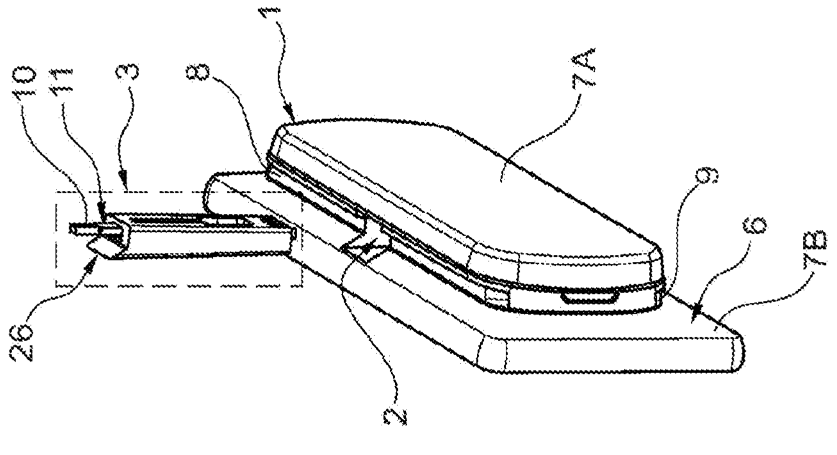
FIG. 3 shows the display unit and the assembled fastening element in the perspective according to FIG. 1, in a schematic manner.

In FIG. 3, in the viewing direction according to FIG. 1, the assembled fastening module 3 can be seen above the accommodating shaft 2 and FIG. 4, in the same viewing direction, shows the display unit 1 with the fastening module 3 pushed into the accommodating shaft 2.

Figure 5:
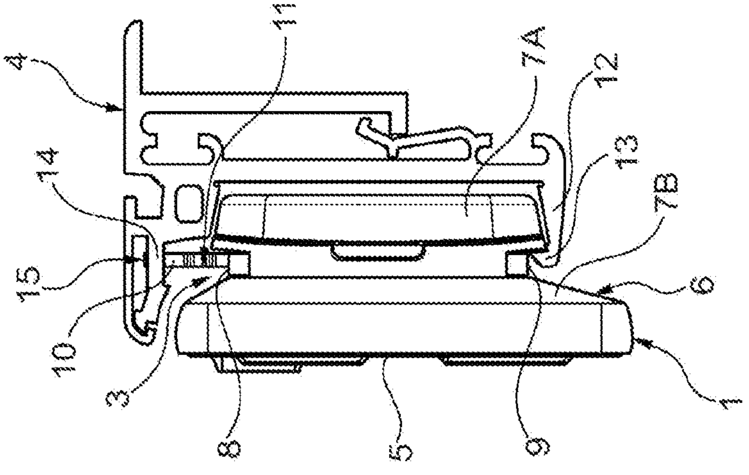
FIG. 5 shows the display unit, which is inserted into the shelf edge strip and fastened there with the aid of the fastening element, in a third perspective, in a schematic manner.

Furthermore, the display unit 1, which is inserted into a shelf edge strip 4, is visualized in FIG. 5. The display unit 1 and the shelf edge strip 4 can be seen here as viewed from the side. A shelf edge strip 4 of this type is typically fastened to the front end of the shelf of a shelving unit in a business premises of a retail trader, from which the meaning of the orientation details "above" and "below", which are used in the following, result in accordance with conventional usage. Consequently, "above" means counter to the direction of gravity and "below" means in the direction of gravity. If the display unit 1 is held differently than illustrated in FIG. 5, these direction details correspondingly designate other sides or parts of the display unit 1.

In general, it is to be established that the display unit 1 comprises a screen 5 on its front side, which is accommodated together with electronics which cannot be seen, that is to say are arranged in the interior, in a housing 6.

On the rear side of the display unit 1, the housing 6 comprises a battery compartment region 7A for accommodating batteries (not visible), which stands out from a screen-gripping region 7B of the housing 6, which grips the screen 5 at the rear side. Between these two regions 7A and 7B of the housing 6, a first (upper) channel 8 and a second (lower) channel 9 are formed. The two channels extends along the transition of the two regions 7A and 7B and run between the two lateral ends of the battery compartment region 7A. The accommodating shaft 2 is located in the centre of the upper channel 8, so that the fastening module 3 can be seen from above and at least a part of a locking element 11 of the fastening module 3, which is formed at the end side as a pin 10, protrudes over an outer edge of the accommodating shaft 2, as can be seen in FIGS. 4 and 5.

As can be seen in FIG. 5, the shelf edge strip 4 comprises a (lower) first fastening rail 12 with a hook-like end section 13, which runs along the entire longitudinal extent thereof, and an (upper) second fastening rail 14 with hole-like recesses 15, which are situated along the width of the longitudinal extent of the shelf edge strip 4 at equidistant spacings from one another, wherein the pin 10 is illustrated in the present case as inserted into one of these hole-like recesses 15. As viewed from below, the hook-like end section 13 engages into the lower channel 9 and there holds the display unit 1 fixed from below as well as fixed at a constant spacing from the shelf edge strip 4. The lower fastening rail 12 only allows an optional movement or positioning of the display unit 1 along the longitudinal extent of the shelf edge strip 4, wherein this movement is of course only possible if the pin 10 is not entered into one of the hole-like recesses 15.

Also, FIG. 5 shows a system which comprises at least one display unit 1 inserted into the shelf edge strip 4.

Figure 6:
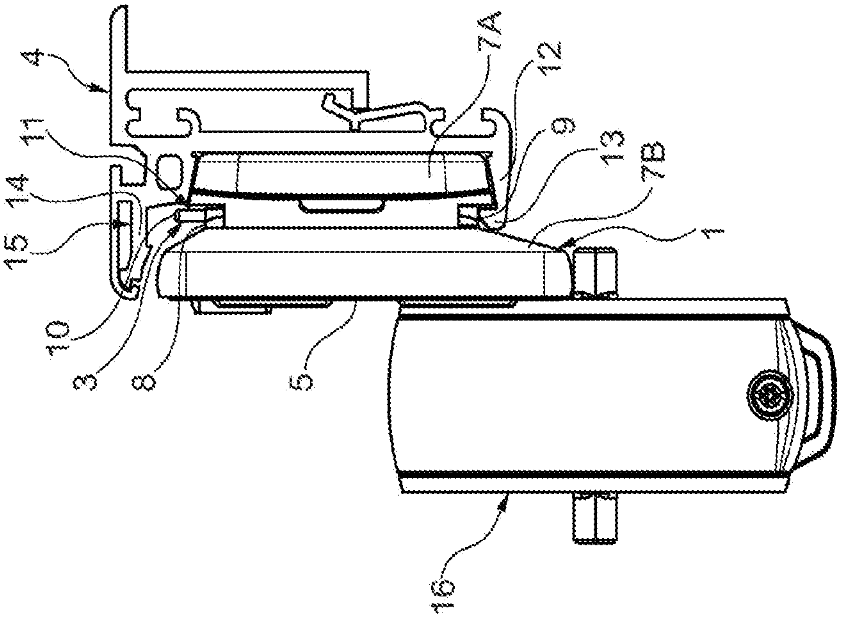
FIG. 6 shows the use of a special tool for removing the display unit from the shelf edge strip, in a schematic manner.

FIG. 6 illustrates how a special tool 16 is positioned on the lower half of the display unit 1 and with the aid of a magnetic force generated by the special tool, the ferromagnetic locking element 11 was moved into its retracted position. The display unit 1, which is thus unlocked at its upper edge from the shelf edge strip 4, can then, held as before at its lower edge by the shelf edge strip 4, be tipped to the left out of the shelf edge strip 4, using its upper edge, and removed from the shelf edge strip 4. The special tool 16 comprises a magnet (not illustrated in detail), which is dimensioned or selected in such a manner with regards to its magnetic force to be generated, that the force is sufficient beyond the distance which is present between the locking element and the magnet and is defined by the geometry of the display unit 1, in order to move the locking element.

Figure 7:
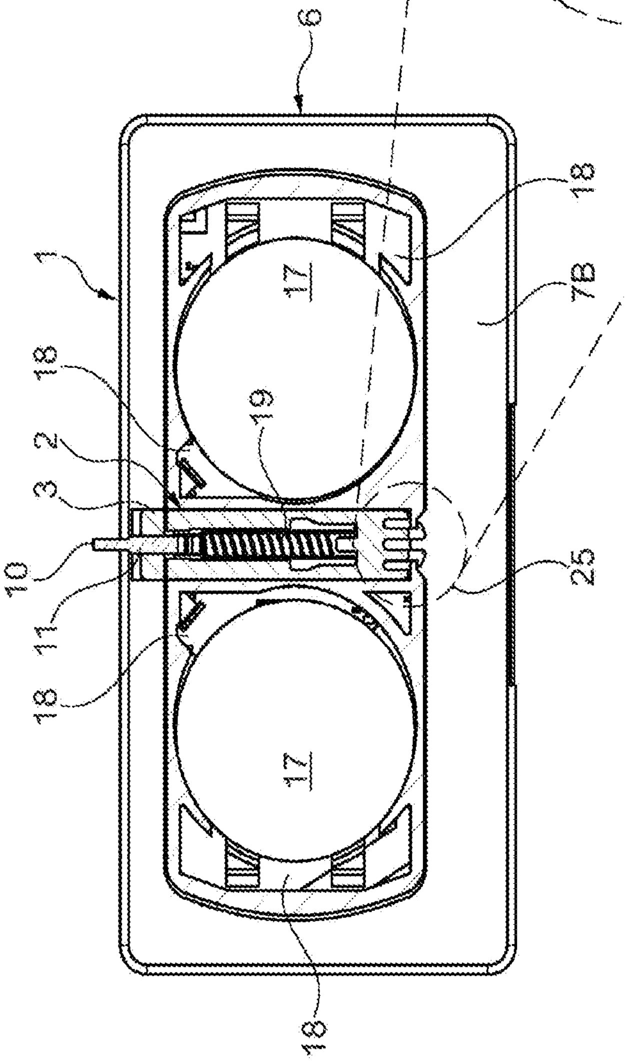
FIG. 7 shows the rear side of the display unit with open battery compartment region and a view of the inserted fastening element, in a schematic manner.

FIG. 7 shows the display unit 1, in which the housing wall of the battery compartment region 7A had been removed from the housing 6. Therefore, two batteries 17 which are contacted with contacting elements 18 can be seen. The accommodating shaft 2, into which the fastening module 3 is inserted, is positioned between the batteries 17. As can clearly be seen in this view, the housing wall of the battery compartment region 7A is a constituent of the accommodating shaft 2 at the back. A coil spring 19 can also clearly be seen in this view, which is arranged in the interior of the fastening module 3 and, in the substantially relaxed state (except for a slight preloading) of the spring, holds the locking element 11 in the extended position thereof. It is also mentioned here that the coil spring 19 can also be seen in FIGS. 1 and 2, but only indicated there roughly schematically as a cylinder.

Figure 8:
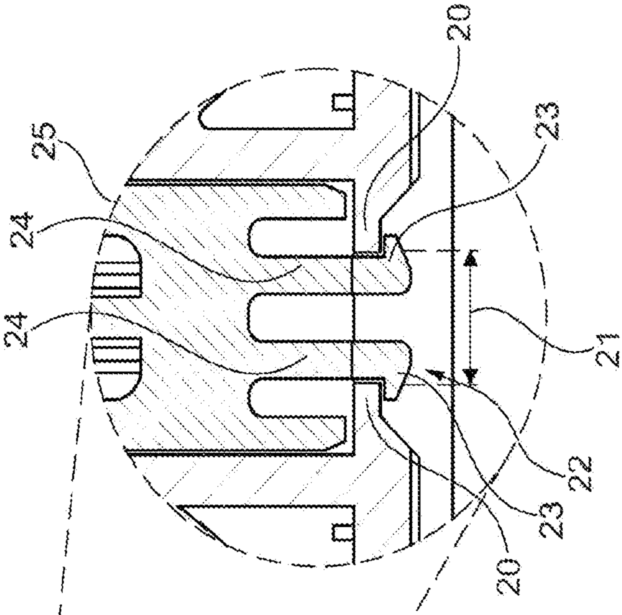
FIG. 8 shows an enlargement of a detail region of FIG. 7, in a schematic manner.

It can also be seen in FIG. 7 that the base 20 of the accommodating shaft 2 comprises a base opening 21, through which a fastening mechanism 22 of the fastening module 3 is guided. In the present case, the fastening mechanism 22 is formed by two hooks 23, which sit on arms 24 which can be bent elastically towards one another, wherein the hooks 23 are orientated away from one another, so that they grip the base 20 on its outer side, as a result of which the fastening module 3 is fixed in the accommodating shaft 2. A detail 25 shows this situation in FIG. 8 enlarged with assignment of the reference numbers mentioned.

Figure 10:
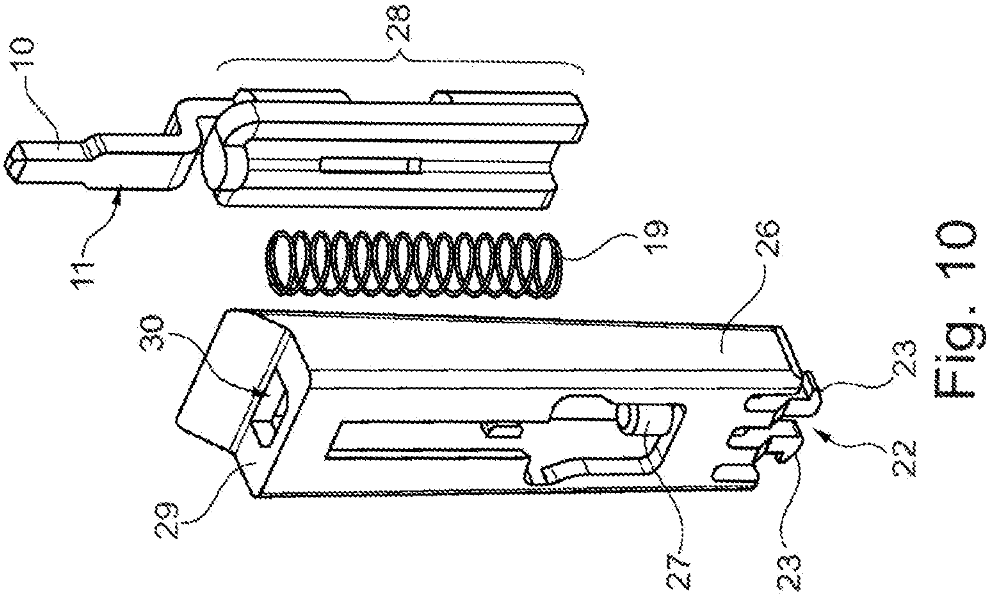
FIG. 10 shows the fastening element, which is disassembled into individual parts, in a schematic manner.
Figure 9:
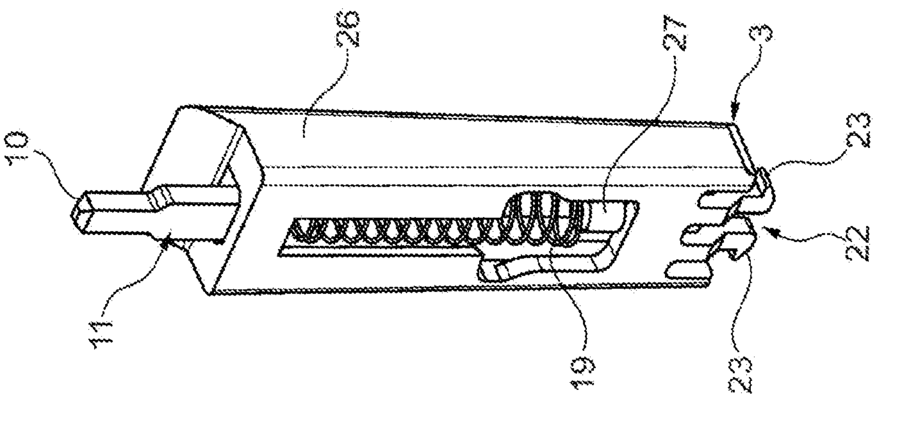
FIG. 9 shows the assembled fastening element, in a schematic manner.

The fastening module 3 can be seen in its assembled state in FIG. 9 and in its state in which it is disassembled into individual parts in FIG. 10. Here, a sleeve 26, which is of substantially rectangular construction in cross section, can be seen in detail. Inserted into the sleeve 26, FIG. 9 also shows that the coil spring 19 interacts with the locking element 11 at the head side and interacts with a bolt 27 at the bottom side. The locking element 11, which can be seen in detail in FIG. 10, comprises a slot-like guide 28, into which the coil spring 19 can be inserted, wherein the slot-like guide is sized such in terms of its width, length and depth, that it can be displaced longitudinally between the retracted position and the extended position inside the sleeve 26, which forms a box-like guide for the locking element 11.

At the head side, the sleeve 26 comprises a cover 29, which shows a cover opening 30, wherein the edge shape corresponds to the shape of the part of the locking element 11 which is guided through it, as can be seen in FIG. 9.

Figure 11:
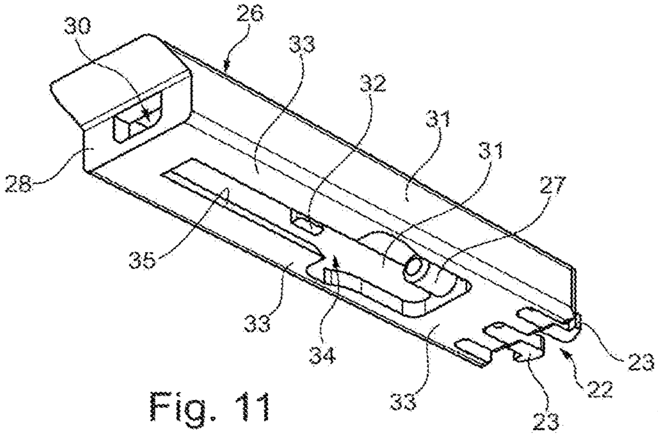
FIG. 11 shows a sleeve of the fastening element in a first perspective, in a schematic manner.
Figure 12:
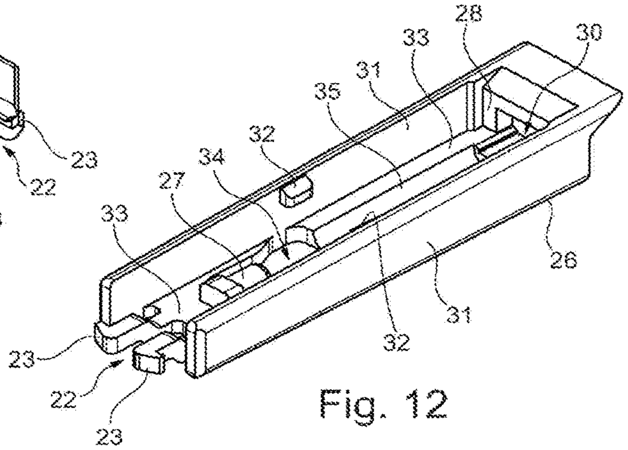
FIG. 12 shows the sleeve in a second perspective, in a schematic manner.

FIGS. 11 and 12 only show the sleeve 26 of the fastening module 3 from two different perspectives. The sleeve 26 is open on one side, so that the coil spring 19 together with the locking element 11 can be inserted from there. This is clearly visible in the perspective of FIG. 12. Side sleeve walls 31 each comprise a guide catch 32, which engage around or behind the inserted locking element 11, in order to prevent it from falling out. A transverse sleeve wall 33, which connects the side sleeve walls 31, comprises a central recess 34 and wall edges 35 which slope towards the recess 34, which wall edges are formed in the region of the inserted coil spring 19 and which are used for guiding and positioning the coil spring 19 when the coil spring 19 is inserted.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. A fastening element, which is configured to fasten or fix a display unit to a support device, the fastening element comprising at least one locking element, which is retractable and extensible and is held in its extended position by a spring, the locking element being provided in the fastening element, the locking element being configured to be moved counter to the force of the spring to a retracted position, wherein the fastening element is realized as a separately insertable fastening module that is configured to be inserted into a housing of the display unit and removable from the housing of the display unit.

2. The fastening element according to claim 1, which is designed or shaped in such a manner that it can be inserted or plugged, particularly such that it can be removed again, into a housing structure of the housing of the display unit, which corresponds to the shape of the fastening module.

3. The fastening element according claim 1, wherein a magnetic or magnetizable component is provided for moving the locking element, so that by means of the action of an external magnetic force on the magnetic or magnetizable component, the locking element can be moved into the retracted position, counter to the force of the spring.

4. The fastening element according to claim 3, wherein the magnetic or magnetizable component is a ferromagnetic component and/or the locking element comprises the magnetic or magnetizable component.

5. The fastening element according to claim 1, which comprises an outer sleeve or a cage, in which both the spring and the locking element are accommodated and the locking element protrudes out of the sleeve at least in the extended position.

6. The fastening element according to claim 1, wherein the spring, which is supported on a sleeve of the fastening element, holds the locking element in the extended position.

7. The fastening element according to claim 1, wherein the locking element is guided in the interior of a sleeve of the fastening element with the aid of a guide and can be displaced along this guide between the extended position and the retracted position.

8. The fastening element according to claim 7, wherein the guide is a box- or tube- or carriage- or rail-like guide.

9. The fastening element according to claim 1, which comprises a head-side cover with a cover opening, wherein the locking element protrudes through the cover opening at least in its extended position.

10. The fastening element according to claim 1, which comprises a side wall adjacent to a cover of the fastening element, in which a side wall opening is recessed, which is designed or shaped in such a manner that the locking element can be inserted into the fastening element or removed from there.

11. The fastening element according to claim 1, wherein the locking element comprises a pin.

12. The fastening element according to claim 1, further comprising hooks on arms that are configured to be bent elastically toward one another and configured to fasten the fastening element to the housing of the display unit.

13. A display unit, which comprises a housing, characterized in that the housing comprises a housing structure and the housing structure is designed for accommodating a fastening element to be fastened to the housing structure, which is realized as a separate fastening module, wherein the fastening element is used for fastening the display unit to a support device, wherein the housing structure is configured to allow the fastening element to slide in a direction substantially parallel to a main surface of a display of the display unit to fasten the fastening element to the housing structure.

14. The display unit according to claim 13, wherein the housing structure is designed as an accommodating shaft which is open towards the outside in accordance with a sleeve-like shape of the fastening module.

15. The display unit according to claim 14, wherein the accommodating shaft extends in the direction substantially parallel to the main surface of the display of the display unit.

16. The display unit according to claim 13, wherein the housing structure is realized in such a manner, particularly dimensioned in terms of depth in such a manner, that when the fastening element is fully inserted into it, a locking element of the fastening element, at least in its extended position, protrudes at the point of the housing structure beyond an outer edge of the housing structure.

17. The display unit according to one of claim 13, wherein the housing structure seals the display unit.

18. The display unit according to claim 13, wherein the display unit comprises a fastening element according to one of claims 1 to 10, which is inserted into the housing structure and realized as a fastening module.

19. A system, which comprises a display unit according to claim 18, and a support device to which the display unit is fastened with the aid of the locking element of the fastening element, which is accommodated in the housing structure of the display unit, wherein the support device comprises at least one recess (15), into which the locking element is entered.

20. The display unit according to claim 13, wherein the display unit is an electronic display unit, or the display unit is an electronic price and/or product information display unit.

* * * * *